(12) United States Patent
Imai

(10) Patent No.: US 6,568,427 B2
(45) Date of Patent: May 27, 2003

(54) CONNECTOR FOR FLUID CONTAINER

(75) Inventor: Takashi Imai, Gyoda (JP)

(73) Assignee: Surpass Industry Co. Ltd., Gyoda (JP)

( * ) Notice: Subject to any disclaimer, the term of this patent is extended or adjusted under 35 U.S.C. 154(b) by 0 days.

(21) Appl. No.: 09/930,027

(22) Filed: Aug. 14, 2001

(65) Prior Publication Data

US 2002/0020449 A1 Feb. 21, 2002

(30) Foreign Application Priority Data

Aug. 21, 2000 (JP) ........................................ 2000-250261

(51) Int. Cl.⁷ .................................................. F17D 1/00
(52) U.S. Cl. ..................................... 137/590; 251/149.6
(58) Field of Search ................................. 137/590, 320, 137/322, 592; 251/144, 149.1, 149.6

(56) References Cited

U.S. PATENT DOCUMENTS 5,108,015 A * 4/1992 Rauworth et al. ........ 222/400.7
6,357,494 B1 * 3/2002 Hahn et al. .................... 141/65
2001/0052366 A1 * 12/2001 Ozawa .................. 137/614.04
2002/0020450 A1 * 2/2002 Ishiwata ................ 137/614.03

* cited by examiner

Primary Examiner—Kevin Lee
(74) Attorney, Agent, or Firm—Kolisch Hartwell, P.C.

(57) ABSTRACT

A connector comprises a synthetic resin plug 11 fitted to an opening portion 1a of a container 1 that stores a liquid, and a socket 13 for connection to the plug 11. The plug 11 comprises, a lid body 14 secured in a fluid tight manner to the opening portion 1a, a plug portion 16 provided on the lid body 14 and connectable to the socket 13, and a siphon tube 17 extending downward from a lower portion of the lid body 14 such that when the lid body 14 is secured to the opening portion 1a, a lower end is arranged near a bottom of the container 1. The siphon tube 17 comprises a tube integrally formed with the lid body 14. As a result, when the liquid inside the container 1 is drawn out, gas leakage from the siphon tube 17 can be reliably prevented, so that erroneous detection of an "empty" detection can be reliably prevented and the liquid completely used up.

16 Claims, 6 Drawing Sheets

CONNECTOR FOR FLUID CONTAINER

FIELD OF THE INVENTION

The present invention relates to a connector which is installed in an opening portion of a container in which a liquid such as semiconductor high purity chemicals or general chemicals is stored.

BACKGROUND OF THE INVENTION

Generally, semiconductor high purity chemicals and general chemicals are stored in a container having sufficient resistance to these chemicals.

Heretofore, as shown in FIG. 6, two opening portions 1a are formed in this container 1, and plugs 3 provided with plug portions 2 are fitted in these openings 1a. A siphon tube 4 which extends to near the bottom of the container 1 is connected to one of the plugs 3.

Then, to draw the liquid stored in the container 1, firstly, a socket 6 connected with a hose 5 is connected to the plug portion 2 of the plug 3 provided in the opening portion 1a of the container 1, and the liquid inside the container 1 is delivered to the hose 5 via the siphon tube 4 by a pump P.

At this time, so that the container 1 interior does not become a negative pressure, inert gas is fed in from a hose 5 connected to the plug 3 on the other side.

Furthermore, completely taking out all the liquid from the inside of the container 1 to make it empty is performed by detecting the presence of an outflow of gas on the side drawing the liquid. Then, when an outflow of gas is detected, it is judged that the container 1 interior is empty, and this empty container 1 is changed for a new container 1 with liquid stored therein.

Incidentally, the siphon tube 4 that takes out the liquid from inside the container 1 has an external thread comprising a taper thread formed on an upper end thereof, and is connected by wrapping a seal tape around this external thread and screwing into an internal thread comprising a taper thread formed on the plug 3 side. However, even by wrapping the seal tape in this manner, gaps can form in the connecting portion so that gas in the container 1 leaks.

Then, in the case where gas has leaked from the connecting section in this way, the gas is detected on the sucking side, so that even though liquid still remains inside the container 1, the container 1 is judged to be empty. Consequently, the container 1 with liquid still remaining is exchanged for a new one with liquid stored therein, being extremely uneconomical.

In addition, when the siphon tube 4 is connected to the plug 3, the seal tape is wrapped around the external thread of this siphon tube 4 as mentioned above, and an O-ring or the like must be inserted, so that this connecting operation requires a great deal of time and effort.

Consequently, it is an object of the present invention to provide a connector that reliably prevents leakage of gas when drawing out a liquid, thus eliminating erroneous detection of empty containers, and enabling the liquid inside the container to be used efficiently.

SUMMARY OF THE INVENTION

The connector of the present invention is one comprising a plug fitted to an opening portion of a container that stores a liquid, and a socket for connection to the plug; and is characterized in that the plug has, a lid body secured in a fluid tight manner to the opening portion, a plug portion provided on the lid body and connectable to the socket, and a siphon tube extending downward from a lower portion of the lid body such that when the lid body is secured to the opening portion a lower end is arranged near a bottom of the container, and the siphon tube comprises a tube integrally formed with the lid body.

According to the present invention, the tube which extends downward from the lid body and which delivers the liquid in the container is integrally formed with the lid body secured to the opening portion of the container to thus constitute the siphon tube. Therefore, when the socket with the connected hose is connected to the plug portion and the liquid inside the container is drawn out by the pump, the undesirable situation where gas leaks from the siphon tube can be reliably prevented. Accordingly, problems where due to gas leaking, there is erroneous detection that the container is empty and hence the container with remaining liquid is exchanged for a new one, can be reliably prevented. That is, it is possible to completely use up the liquid without any liquid remaining inside the container, thus being extremely economical.

Moreover, because the siphon tube and the lid body are integrally formed, then in comparison to the case where a separate tube is connected by screwing into the lid body, the complicated connection operation can be eliminated.

In addition, the connector of the present invention is one comprising a plug fitted to an opening portion of a container that stores a liquid, and a socket for connection to the plug; and is characterized in that the plug has, a lid body secured in a fluid tight manner to the opening portion, a plug portion provided on the lid body and connectable to the socket, and a siphon tube extending downward from a lower portion of the lid body such that when the lid body is secured to the opening portion a lower end is arranged near a bottom of the container, and the siphon tube comprises a tube integrally formed with the lid body and an extension tube abutted against an end of the tube body with the abutting portions welded together and integrated in a fluid tight manner.

According to the present invention, the siphon tube comprises the lid body secured to the opening portion of the container, the tube integrally formed with the lid body, and an extension tube welded to this tube and integrated in a fluid tight manner. Therefore, when the socket with the connected hose is connected to the plug portion and the liquid inside the container is drawn out by the pump, the undesirable situation where gas leaks from the siphon tube can be reliably prevented. Accordingly, problems where due to gas leaking, there is erroneous detection that the container is empty and hence a container with remaining liquid is exchanged for a new one can be reliably prevented. That is, it is possible to completely use up the liquid without any liquid remaining inside the container, thus being extremely economical.

In addition, because the tube and the extension tube are integrally formed by welding, then in comparison to the case where this is connected by screwing and securing the tube to the internal thread of the lid body, leakage from the connecting portion can be reliably prevented.

DETAILED DESCRIPTION OF THE PREFERRED EMBODIMENTS OF THE PRESENT INVENTION

Hereunder is a description of a connector of the present invention, with reference to the drawings.

Figure 1:
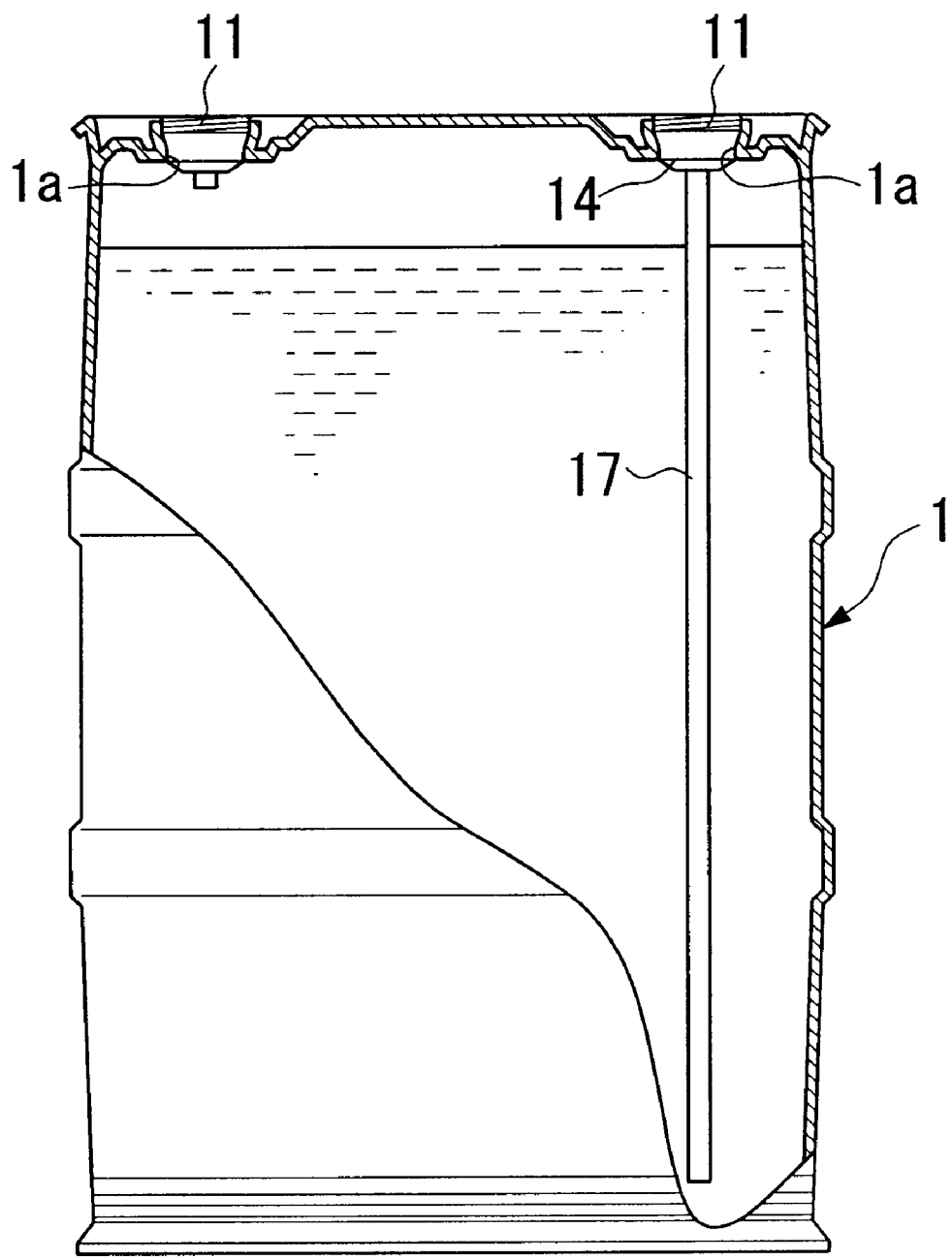
FIG. 1 is a cross-section of a container provided with a connector, for explaining the configuration and construction of a connector of the present invention.
Figure 2:
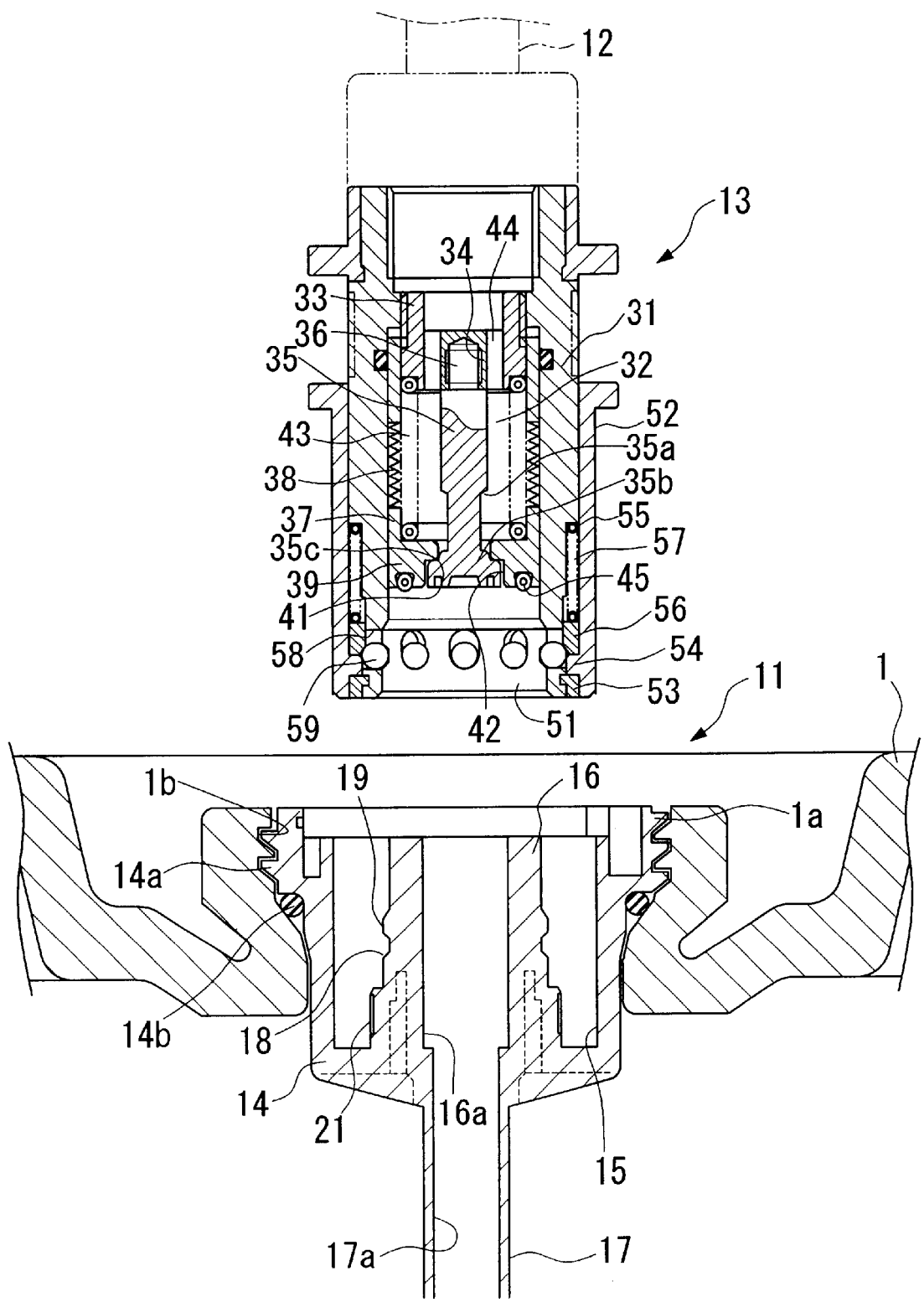
FIG. 2 is a cross-section of a plug and socket constituting the connector, for explaining the configuration and construction of the connector of the present invention.

In FIG. 1 and FIG. 2, reference symbol 11 denotes a plug constituting a connector. The plug 11 is installed in an opening portion 1a of a container 1, and together with a socket 13 connected to a hose 12, constitutes the connector.

The plug 11 is formed from synthetic resin, and has; a lid body 14 screw fitted to the opening portion 1a of the container 1, a plug portion 16 protruding at a center of a cavity portion 15 formed in the lid body 14, and a siphon tube 17 provided at a lower portion of the lid body 14.

The plug portion 16 is formed in a cylindrical shape with a through hole 16a in the center, and is integrally formed with the lid body 14. In the plug portion 16 on an outer peripheral face thereof is formed an annular engaging groove 18 around the circumferential direction. When the socket 13 is connected to the plug portion 16, locking balls 59 mentioned below, are engaged in this engaging groove 18. Moreover, the tip end side of the engaging groove 18 constitutes an engaging protrusion 19 formed around the circumferential direction, for pressing in the locking balls 59 as mentioned below.

Moreover, the siphon tube 17 is formed as a long tube having a passage 17a in the center, and similarly to the plug portion 16, is integrally formed with a lower edge portion of the lid body 14.

The passage 17a of the siphon tube 17 and the through hole 16a of the plug portion 16 are mutually communicated.

Furthermore, the siphon tube 17 is formed to a length such that when the lid body 14 is screwed into and secured to the opening portion 1a of the container 1, the lower end is arranged near the bottom of the container 1.

The lid body 14 has on the outer peripheral side on an upper edge thereof, an external thread 14a that can be threadedly engaged with an internal thread 1b formed in the opening portion 1a of the container 1. By screwing this external thread 14a into the internal thread 1b of the opening portion 1a, the lid body 14 is secured to the opening portion 1a of the container 1. In addition, on the lid body 14, an O-ring 14b is provided on the lower side of the external thread 14a, so that when the lid body 14 is secured to the opening portion 1a, the space between the opening portion 1a and the lid body 14 is sealed by the O-ring 14b.

Figure 3:
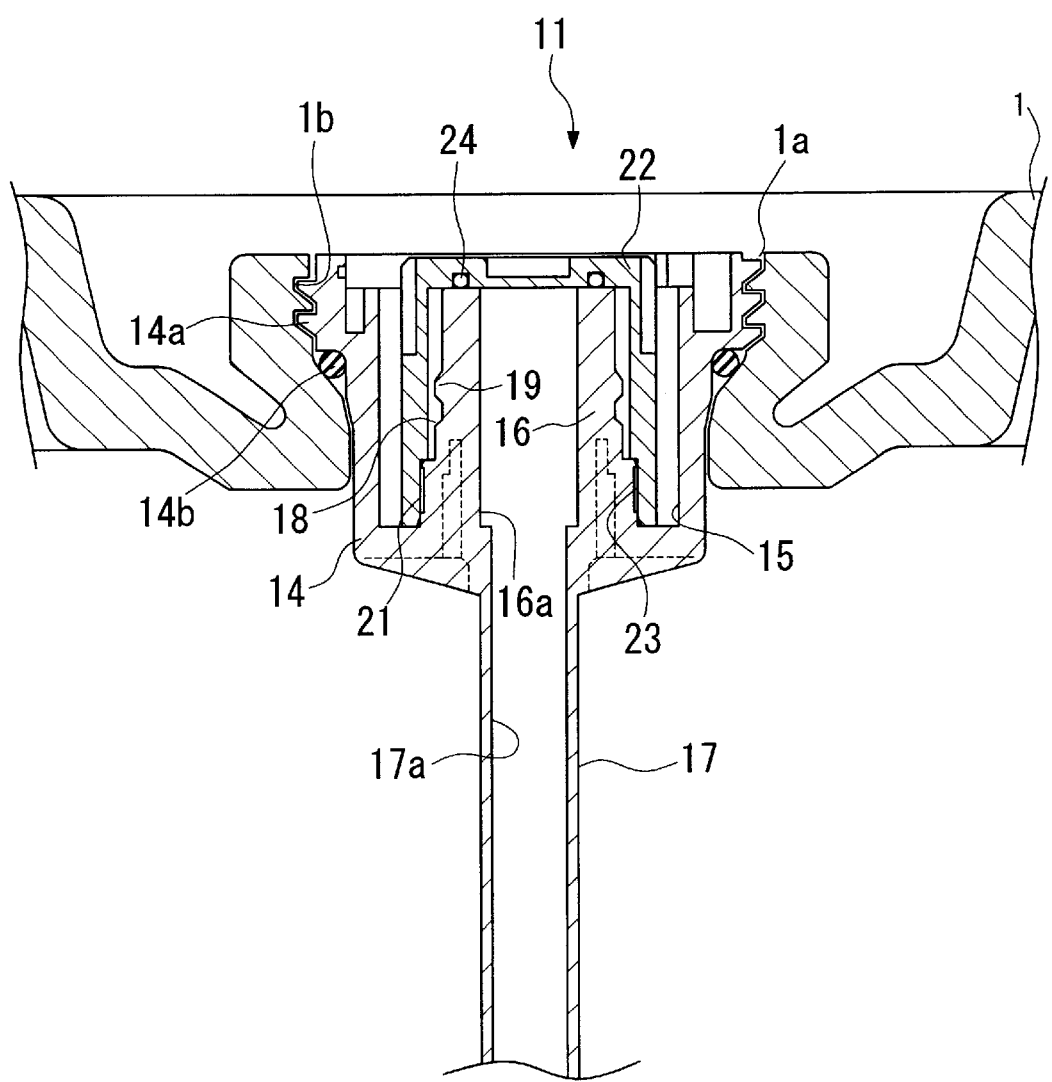
FIG. 3 is a cross-section of a plug, for explaining the configuration and construction of the connector of the present invention.

Moreover, an external thread 21 is formed on the outer peripheral face of the plug portion 16 near the base, and onto this external thread 21, as shown in FIG. 3, is threadedly engaged an internal thread 23 formed on an inner face on an open end side of a cap 22 formed in a bottomed cylinder shape. The cap 22 has an O-ring 24 provided on the bottom face thereof. The cap 22 covers the plug portion 16 of the plug 11, and by screwing the internal thread 23 onto the external thread 21 of the plug portion 16, the cap 22 is fitted to the plug portion 16, and the O-ring 24 provided on the bottom face is abutted against the end face of the plug portion 16, so that the plug portion 16 is completely closed off.

In short, the container 1 is transported in the condition with the cap 22 installed on the plug portion 16.

Next, is a description of the configuration and construction of the socket 13 connected to the plug portion 16 of the plug 11 of the above-mentioned construction. Reference symbol 31 denotes a main barrel formed with a valve bore 32 thereinside. In the valve bore 32 of the main barrel 31, a stopper 33 is secured to a rear end portion, and in this stopper 33 an external thread 36 on an end of a rod shape valve member 35 is threadedly secured to an internal thread 34 formed in the center of the stopper 33.

Regarding this valve member 35, a neck 35a is formed near the tip end portion, and a large diameter valve 35b is formed at the end ahead of the neck 35a. Moreover, in this valve 35b, a step 35c is formed on the neck 35a side.

Furthermore, a bellows member 37 is provided in the valve bore 32. This bellows member 37 is formed in a cylindrical shape and has a bellows portion 38 formed with a corrugated cross-section at a central portion, the bellows portion 38 being able to expand and contract in an axial direction. This bellows member 37 is secured by clamping a rear end portion thereof between the outer peripheral face of the stopper 33 and the inner peripheral face of the main barrel 31. In addition, in the bellows member 37 a valve seat portion 39 is formed on a tip end side thereof. This valve seat portion 39 has a bore 41 in the center. A tip end side of this bore 41 is formed with a large diameter and this part becomes a step 42.

Moreover, a spring 43 is provided between the stopper 33 and the valve seat portion 39 of the bellows member 37. By means of this spring 43, the valve seat portion 39 of the bellows member 37 is always urged towards the tip end. Accordingly, the valve 35b of the valve member 35 is engaged in the bore 41 of the valve seat portion 39, thus closing off between the valve 35b and the valve seat portion 39.

In addition, a plurality of channels 44 are formed in the stopper 33 spaced around the circumferential direction, and by means of these channels, the hose 12 side and the bellows member 37 interior are communicated.

An O-ring 45 is provided in the tip end face of the valve seat portion 39 around the circumferential direction.

Furthermore, a cavity portion 51 is formed in the tip portion side of the main barrel 31 so that the plug portion 16 can be fitted into the cavity portion 51. Moreover, a sleeve 52 is slidingly provided on the outer periphery of the main barrel 31, and the sleeve 52 is prevented from coming off from the tip portion of the main barrel 41 by means of a stop ring 53 provided on the tip portion of the main barrel 31. A protruding portion 54 is provided on the inner face side of the sleeve 52 in the vicinity of the tip portion thereof, and between this protruding portion 54 and a step 55 formed on the outer peripheral face of the main barrel 31 there is provided an urging ring 56 and a spring 57. Then, by means of the spring 57, the sleeve 52 is always urged towards the tip of the main barrel 31.

Furthermore, in the vicinity of the tip section of the main barrel 31 there is formed apertures 58 comprising bowl shaped elongate holes spaced apart around the circumferential direction, and locking balls 59 are provided in these apertures 58. Then with the sleeve 52 moved towards the rear end of the main barrel 31, the locking balls 59 are able to move away from the inner face side of the cavity portion 51 of the main barrel 31, and when the sleeve 52 is moved to the tip end side by the urging force of the spring 57, the locking balls 59 are pressed to the inner face side by the protruding portion 54 of the sleeve 52, so that they are held with a part thereof protruding from the inner face side of the cavity portion 51.

Figure 4:
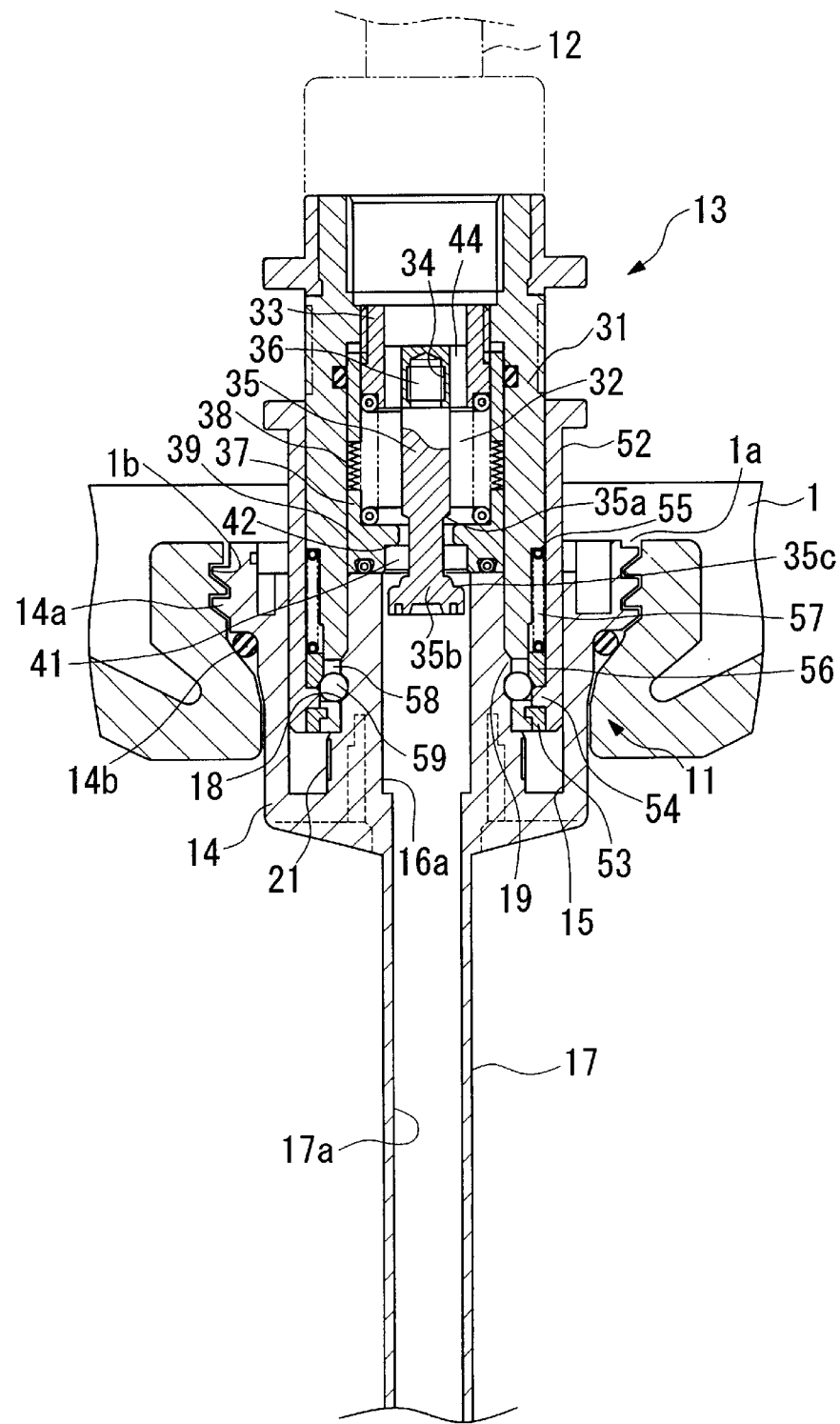
FIG. 4 is a cross-section of a plug and socket connected to each other, for explaining the configuration and construction of the connector of the present invention.

With the connector of the above construction, by pressing the socket 13 onto the plug portion 16 of the plug 11, then as shown in FIG. 4, the socket 13 is secured to the plug portion 16 of the plug 11 with one touch.

Hereunder is a description of the method of this connection.

When the socket 13 is pushed into the plug portion 16 of the plug 11, firstly, the locking balls 59 of the socket 13 are abutted against the engaging protrusion 19 of the plug portion 16. Then, when the socket 13 is inserted, the locking balls 59 are pressed out to the outer peripheral side by the engaging protrusion 19. Accordingly, the urging ring 56 that is provided on the outer peripheral side of the locking balls 59, is moved to the rear side of the socket 13, against the urging force of the spring 57. As a result, the locking balls 59 enter into the gap formed between the urging ring 56 and the protruding portion 54 of the sleeve 52.

Moreover, when the socket 13 is pushed into the plug portion 16, and the locking balls 59 cross over the engaging protrusion 19, the locking balls 59 urged towards the inner face side of the cavity portion 51 by the spring 57 via the urging ring 56, are pressed out towards the inner face side of the cavity portion 51 and enter into the engaging groove 18. In addition, the urging ring 56 is moved to the tip end of the socket 13, and abutted against the protruding portion 54 thus closing the gap.

In this condition, the socket 13 is connected to the plug portion 16, and even if a force acts on the socket 13 to remove this from the plug portion 16, movement of the locking balls 59 towards the outer peripheral face is restricted by the protruding portion 54 of the sleeve 52. Accordingly, the reliably locked condition of the socket 13 and the plug portion 16 is ensured.

When the socket 13 is connected to the plug portion 16 in this manner, the valve seat portion 39 of the bellows member 37 of the socket 13 is abutted against the tip end portion of the plug portion 16. Accordingly, the valve seat portion 39 is pushed to the rear end side of the socket 13 against the urging force of the spring 43, and the bellows member 38 is contracted. In addition, the valve 35b of the valve member 35 of the socket 13 becomes inserted into the inside of the through hole 16a of the plug portion 16.

As a result, the valve seat portion 39 of the bellows member 37 and the valve 35b of the valve member 35 are separated, and a channel is formed therebetween, so that the hose 12 that is connected to the socket 13 and the passage 17a of the siphon 17 of the plug 11 are mutually communicated.

Moreover, in the other opening portion 1a of the container 1, a plug 11 without a siphon tube 17 is fitted, and a socket 13 connected with a hose 12 for supplying inert gas to the inside of the container 1 is connected to the plug 11.

Then, as mentioned above, after connecting the socket 13 to the plug 11, the liquid inside the container 1 is sucked up from the lower end of the siphon tube 17 by operating the pump P, and is passed through the inside of the plug 11 and the socket 13 and delivered to the hose 12.

At this time, the inert gas is delivered from the hose 12 of the socket 13 connected to the plug 11 of the opening portion 1a on the other side, to fill the container 1 interior so that the container 1 interior does not become a negative pressure.

When the liquid inside the container 1 is drawn out so that the container is empty, the inert gas filled into the container 1 flows into the siphon tube 17. As a result, an "empty" detection device provided downstream of the pump P detects the inflow of gas thereby judging that the container 1 is empty. Then, this container 1 that is judged to be empty is replaced, and removal of liquid from a new container 1 in which liquid is stored is performed.

In the case where the socket 13 is removed from the plug 11, the sleeve 52 of the socket 13 is drawn to the rear end side. By so doing, this is moved to the rear end of the socket 13 while the protruding portion 54 of the sleeve 52 raises the urging ring 56. Accordingly, at the tip end of the protruding portion 54, a gap is formed between this protruding portion 54 and the stop-ring 53. Then, in this situation, when the socket 13 is pulled out from the plug portion 16, the locking balls 59 are moved by the engaging protrusion 19 to the outer peripheral side by entering the gap between the protruding portion 54 and the stop ring 53, so that the socket 13 can be pulled out of the plug portion 16.

Then, in the situation with the sleeve 52 drawn to the rear end side in this way and the lock released, when the socket 13 is pulled from the plug portion 16, the valve seat portion 39 of the bellows member 37 of the socket 13 is urged towards the tip end by the spring 43. As a result, the valve 35b of the valve member 35 is engaged in the bore 41 of the valve seat portion 39, and the channel formed between the valve seat portion 39 and the valve 35b is closed off.

In short, by pulling out the socket 13 from the plug portion 16 while drawing the sleeve 52 of the socket 13 to the rear end side, the socket 13 can be very easily removed from the plug 11 to release the connection.

In this way, according to the above connector, regarding the plug 11, the tube which extends downward from the lid body 14 and which delivers the liquid in the container 1 is integrally formed with the lid body 14 secured to the opening portion 1a of the container 1 to thus constitute a siphon tube 17. Therefore, when the socket 13 with the connected hose 12 is connected to the plug portion 16 and the liquid inside the container 1 is drawn out by the pump P, the undesirable situation where gas leaks from the siphon tube 17 can be reliably prevented. Accordingly, problems where due to gas leaking, there is erroneous detection that the container 1 is empty and hence the container 1 with remaining liquid is exchanged for a new one, can be reliably prevented. That is, it is possible to completely use up the liquid without any liquid remaining inside the container 1, thus being extremely economical.

Moreover, because the siphon tube 17 and the lid body 14 are integrally formed, then in comparison to the case where a separate tube is connected by screwing into the lid body 14, the complicated connection operation can be eliminated.

Furthermore, because the plug portion 16 for connecting to the socket 13 is also integrally formed with the lid body 14, leakage of gas from between the lid body 14 and the plug portion 16 can also be reliably prevented.

Figure 5:
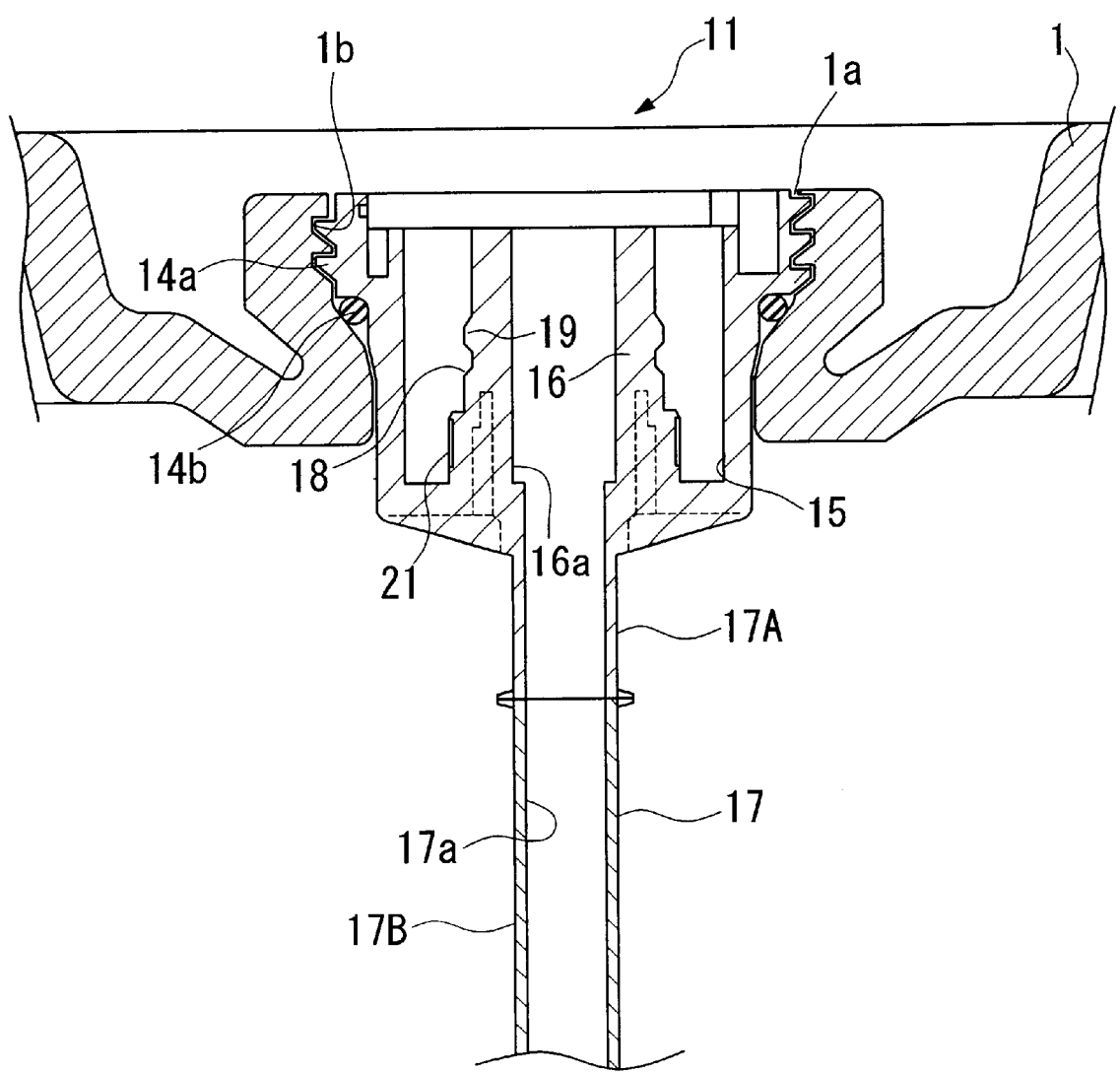
FIG. 5 is a cross-section of a plug, for explaining an other configuration and construction of the connector of the present invention.
Figure 6:
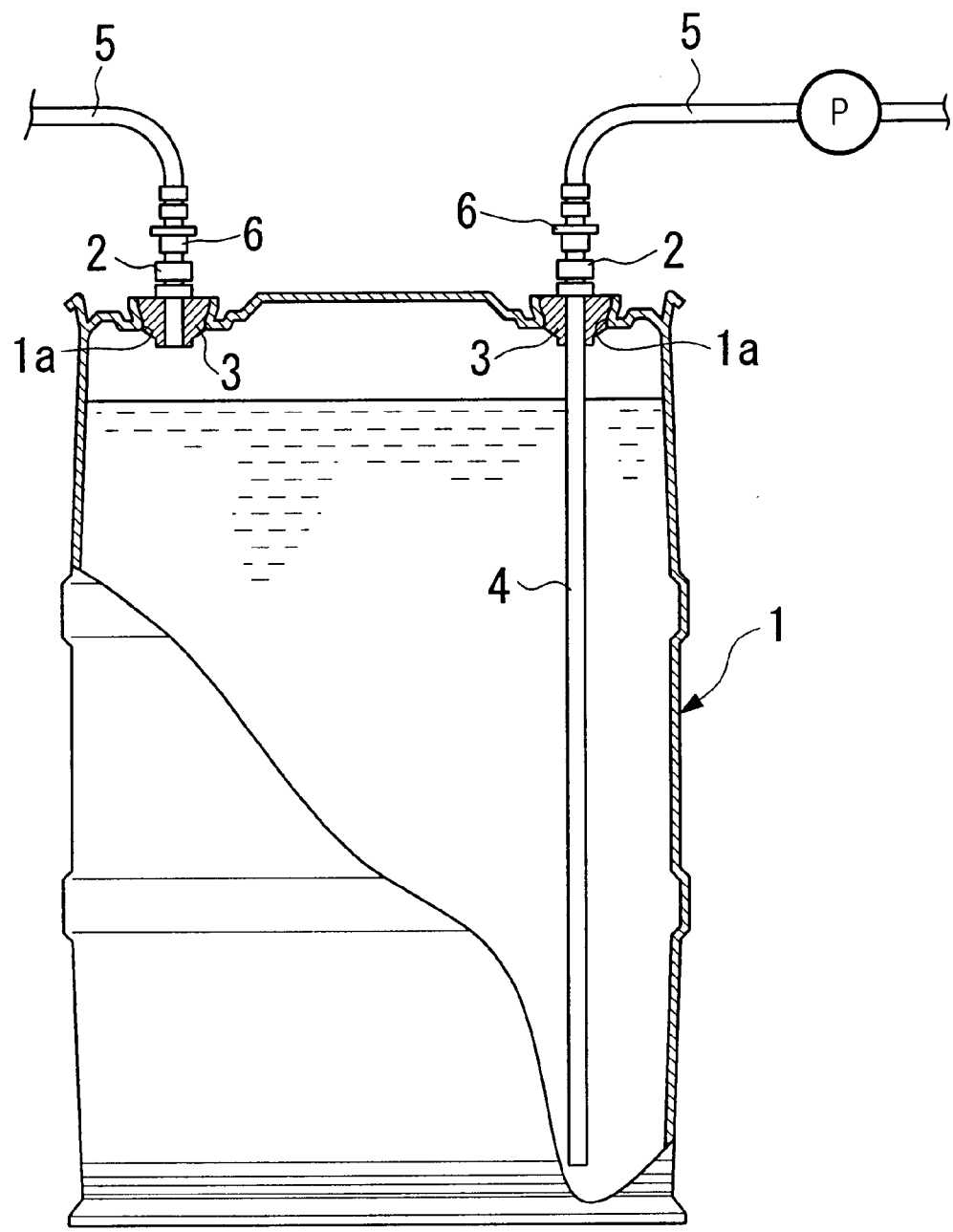
FIG. 6 is a cross-section of a container, for explaining conventional technology of a connector.

FIG. 5 illustrates a plug 11 constituting a connector of another embodiment. This plug 11 comprises a siphon tube 17 made from a tube 17A integrally formed with the lid body 14 and an extension tube 17B connected to the end of the tube 17A.

The tube 17A and the extension tube 17B constituting this siphon tube 17 are integrated in a fluid tight manner by abutting together, and then welding together the abutted portions.

Also in the case of the plug 11 constituting this connector, the siphon tube 17 made from the tube 17A integrally formed with the lid body 14 and the extension tube 17B welded and integrated in a fluid tight manner to this tube 17A, is constructed on the lid body 14 secured to the opening portion 1a of the container 1. Therefore, when the socket 13 with the connected hose 12 is connected to the plug portion 16 and the liquid inside the container 1 is drawn out by the pump P, the undesirable situation where gas leaks from the siphon tube 17 can be reliably prevented. Accordingly, problems where due to gas leaking, there is erroneous detection that the container 1 is empty and hence the container 1 with remaining liquid is exchanged for a new one, can be reliably prevented. Hence it is possible to completely use up the liquid without any liquid remaining inside the container 1, thus being extremely economical.

In addition, because the tube 17A and the extension tube 17B are integrally formed by welding, then in comparison to the case where this is connected by screwing and securing the tube to the internal thread of the lid body, leakage from the connecting portion can be reliably prevented.

What is claimed is:

1. A connector comprising a plug fitted to an opening portion of a container that stores a liquid, and a socket for connection to said plug; wherein said plug has a lid body secured in a fluid tight manner to said opening portion, a plug portion integrally formed with said lid body and connectable to said socket, and a siphon lube integrally formed with said lid body and extending downward from a bottom of said lid body.

2. A connector according to claim 1, wherein when said lid body is secured to said opening portion, a lower end of said siphon tube is arranged near a bottom of said container.

3. A connector according to claim 1, wherein said lid body and said plug portion are integrally formed.

4. A connector according to claim 1, wherein said plug is formed from synthetic resin.

5. A connector according to claim 1, wherein said plug portion is formed in a cylindrical shape with a through hole in the center.

6. A connector according to claim 5, wherein a valve is provided in said socket which opens a passage so as to communicate with said through hole of said plug portion when said socket is connected to said plug portion.

7. A connector according to claim 1, wherein there is provided engaging means for connecting said socket to said plug portion to thereby engage these together and maintain the engaged condition.

8. A connector according to claim 1, wherein a hose having a pump is connected to said socket, and by means of said pump liquid inside said container is sucked up via said siphon tube.

9. A connector comprising a plug fitted to an opening portion of a container that stores a liquid, and a socket for connection to said plug; wherein said plug has a lid body secured in a fluid tight manner to said opening portion, a plug portion provided on said lid body and connectable to said socket, and a siphon tube comprises a tube integrally formed with said lid body and an extension tube abutted against an end of said tube with the abutting portions welded together and integrated in a fluid tight manner.

10. A connector according to claim 9, wherein when said lid body is secured to said opening portion, a lower end of said siphon tube is arranged near a bottom of said container.

11. A connector according to claim 9, wherein said lid body and said plug portion tube are integrally formed.

12. A connector according to claim 9, wherein said plug is formed from synthetic resin.

13. A connector according to claim 9, wherein said plug portion is formed in a cylindrical shape with a through hole in the center.

14. A connector according to claim 13, wherein a valve is provided in said socket which opens a passage so as to communicate with said through hole of said plug portion when said socket is connected to said plug portion.

15. A connector according to claim 9, wherein there is provided engaging means for connecting said socket to said plug portion to thereby engage these together and maintain the engaged condition.

16. A connector according to claim 9, wherein a hose having a pump is connected to said socket, and by means of said pump liquid inside said container is sucked up via said siphon tube.

* * * * *